UNITED STATES PATENT OFFICE.

THOS. COBLEY, OF HAHL, BAVARIA, AND JAS. C. COOMBE, OF HOXTON, COUNTY OF MIDDLESEX, ENGLAND.

IMPROVEMENT IN THE MANUFACTURE OF PORCELAIN, GLASS, &c., BY THE USE OF FLUOSILICATES.

Specification forming part of Letters Patent No. 38,286, dated April 28, 1863.

*To all whom it may concern:*

Be it known that we, THOMAS COBLEY, of Hahl, Bavaria, proprietor of mines, and JAMES CANE COOMBE, of Haberdasher Street, Hoxton, in the county of Middlesex, Great Britain, chemist, have invented an invention for an improved application of the fluosilicates of metallic and non-metallic bases in the manufacture of glass, porcelain, and other ceramic wares as pigments, and for the production of glazes and enamels; and we do hereby declare that the following specification is a description of our invention sufficient to enable those skilled in the art to practice it.

To produce the fluosilicates of the bases which we propose to make use of we take any easily-obtained solution of such of the various bases as will form a precipitate by the addition of hydrofluosilic acid. We continue to add the acid until precipitation ceases. The precipitate is washed and collected for use. The supernatant acid thus recovered we apply to form fresh solutions, and by this means we use it over and over again in the process, being what is called a "carrier." Otherwise we take the carbonates or oxides of the bases and dissolve them up in the hydrofluosilic acid until the acid becomes perfectly neutralized with the base. Where a gelatinous product is required—as with lime, for example—and a carbonate is used, we heat the mass, so as to drive off the residuary carbonic acid and induce the molecular arrangement of the product. Finally, aviling ourselves of the chemical fact that hydrofluosilic acid combines with the silicates of the bases and forms with them fluosilicates, we take any of such silicates—either native or artificial—and add the chemical equivalent of hydrofluoric acid, so as to form a fluosilicate. The fluosilicates thus obtained we propose applying to the following purposes: the fluosilicates of zinc, baryta, and potash in the manufacture of glass, for the purpose of economizing the use of lead, and for obtaining glass of a more perfect quality and free from veins and striæ. In applying these in this manufacture we prefer first fritting or fusing the fluosilicate to be employed with the silicate of another base or its carbonate or oxide—for example, the fluosilicate of baryta and alumina—in combination with such materials as will form with the said fluosilicate translucent and semi-opaque bodies—for example, with kaolin, ground flint, lime, or magnesia, and precipitated silica. The fluosilicates are mixed up together with the other materials in the form of what the potters term "slip," or a liquid state, of the ordinary consistency.

The proportion of the mixtures must be varied according to the quality of the ware to be produced—that is to say, in regard to its transparency.

We propose to use the fluosilicates of lead, zinc, and baryta as pigments for glazing and enameling and as a substitute for the ordinary lead glaze, producing white transparent glazes without borax and white opaque without the addition of tin, and through the intimate chemical combination of the materials to obtain more elegant results.

The mode of application is the same as that ordinarily employed with the glazes now in use.

For the latter application we prefer heating them in the same way as in glass-making, by previous fusion or fritting with a silicate or oxide of the base to be admixed or of that employed.

Having now described our invention and how the same is produced and used, we wish it understood that what we claim, and desire secured to us by the before in part recited Letters Patent, is—

1. The application of fluosilicates, in combination with artificial silicates of the alkalies, alkaline earths, and other earthy bases, to the manufacture of glass, pottery, porcelain, and other ceramic and plastic wares, and more particularly the substitution of the fluosilicic salts of the alkalies, alkaline earths, and other earthy bases for the phosphoric compounds of the same or other bases in the manufacture of glass, pottery, porcelain, and other ceramic and plastic wares.

2. The application of the fluosilicates of lead and baryta, either separately or together, to the manufacture of glass and porcelain, either as a glaze or as a pigment, and either applied and used as direct or real fluosilicates or by the admixture of any salt of lead or baryta with any fluoric or siliceous or fluosiliceous material, so as to obtain the same results as if a fluosilicate had been actually employed.

3. The application of fluosilicate of tin as a pigment or glaze or enamel in the manufacture of porcelain of baryta, in combination with fluosilicate of zinc, as a substitute for lead in the manufacture of glass, and in combination with fluosilicate of tin as a glaze or enamel in the manufacture of porcelain, and of the fluosilicate of zinc, either alone or in combination with fluosilicate of baryta in the manufacture of glass, substantially as described and set forth in the body of this specification.

TH. COBLEY.
JAMES CANE COOMBE.

Witnesses:
SAMUEL ARCHBUTT,
R. WM. WELCH.